Oct. 9, 1951      J. YARMAK      2,571,084
GATHERING AND CONVEYING MECHANISM
Filed Oct. 7, 1948      2 Sheets—Sheet 1

Inventor:
Julius Yarmak

Oct. 9, 1951  J. YARMAK  2,571,084
GATHERING AND CONVEYING MECHANISM
Filed Oct. 7, 1948  2 Sheets-Sheet 2
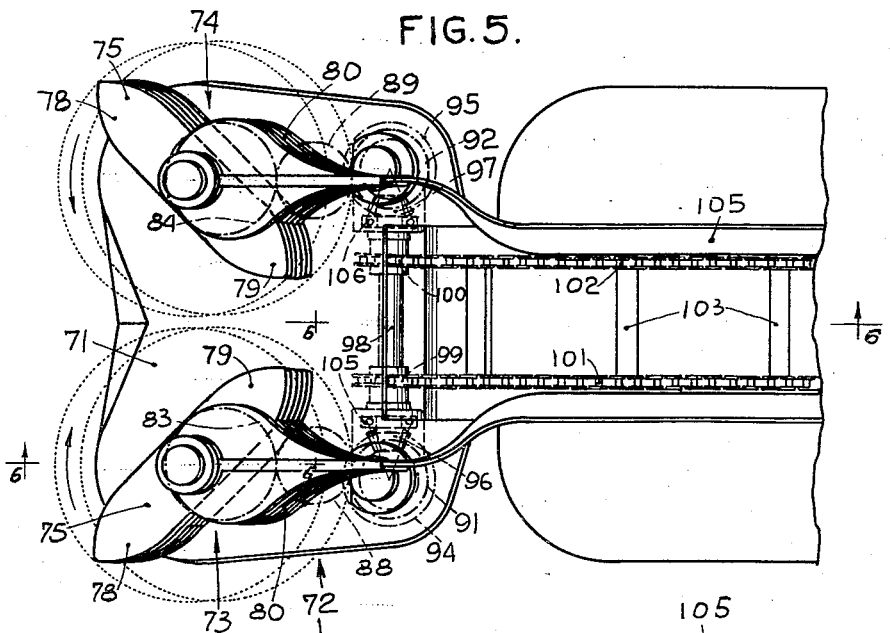
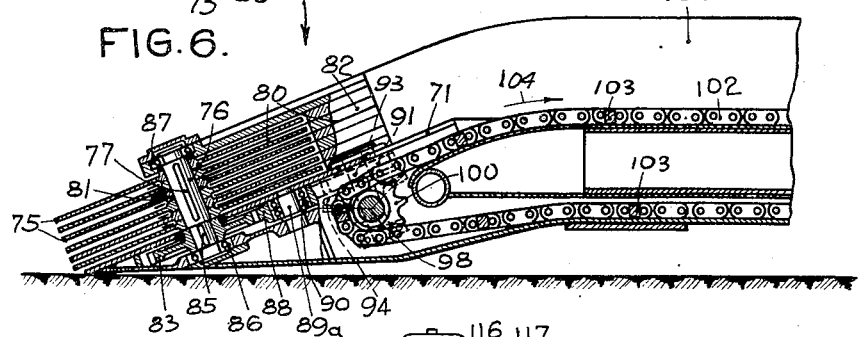
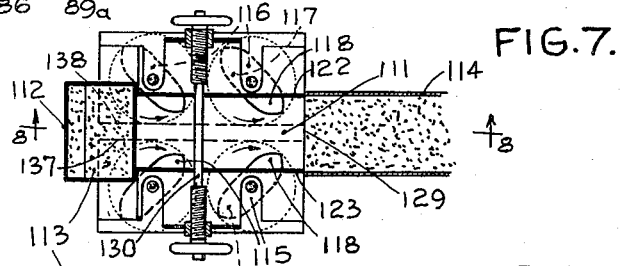
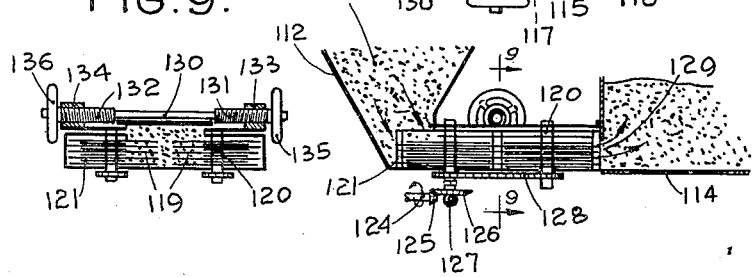
Inventor:
Julius Yarmak Patented Oct. 9, 1951

2,571,084

UNITED STATES PATENT OFFICE 2,571,084

GATHERING AND CONVEYING MECHANISM

Julius Yarmak, Wakefield, England

Application October 7, 1948, Serial No. 53,207
In Great Britain October 16, 1947

3 Claims. (Cl. 198—9)

The invention refers to a gathering and conveying mechanism adapted for use in cutting sweepers or gummers associated with chain cutting machines, in loading machines, in feeders and in similar machines for mining and conveying coal and like minerals especially in such cases where the discharge opening due to the conditions of operation is not free from conveyed material and therefore discharging has to be performed under pressure.

The gathering and conveying mechanism according to the present invention comprises one or several identical impellers provided with laminated arms or blades acting on conveyed material by having simple circular rotational motion on a vertical or slightly inclined from vertical position axis or axes and which arms or blades are adapted to pass through a correspondingly laminated separation wall or walls during their rotating motion.

Thus one feature of the described mechanism is that the gathering, sweeping or conveying impeller arms or blades are formed by several parallel and substantially horizontal or slightly inclined laminae mounted on a common shaft. By such a construction said arms or blades are able to pass freely through a separation wall or diaphragm formed in a similar manner to the blades by an adequate number of parallel and substantially horizontal or slightly inclined laminae.

By the said feature of construction the well known quality of loose coal or other conveyed material as a mealy substance is used by which quality, contrary to fluid substances, conveyed mealy or grainy materials are not able to flow even under any pressure through a wall or substantially vertical diaphragm built up from a plurality of horizontal or slightly inclined (i. e. inclined less than the limiting angle of repose or friction for a material conveyed) laminae, provided they are wide enough and in spite of the free distances between each pair of adjacent laminae which may exceed by many times the dimensions of the separate particles or grains of the mealy or grainy substance of conveyed material.

Therefore a possibility is created for taking away cuttings, loose coal or other conveyed material from any place where they are spread and lie free without any pressure by using laminated conveying members to pump them by continuous pressure into a pile or other mass of conveyed material in one constant direction only without dragging or enabling any part of the material to be drawn back.

Another feature of the mechanism which is an object of this invention is that the working profiles of the laminated arms or blades and those of the laminated separation walls or diaphragms through which the arms or blades pass, are thus enmeshed profiles which have a large angle at each point of intersection. This angle is always larger than the self-wedging or bruise angle, such that pieces or grains of coal or other conveyed material will be pushed out easily without any wedging, bruising and crushing between said profiles.

The gathering and conveying mechanism of the described type may be adapted for use in many different machines as was mentioned previously, but one application in which the mechanism is especially adaptable is cuttings-sweepers or gummers associated with chain coal-cutting machines.

In that case a machine of the cutter chain type, as used for cutting coal and other minerals, is provided with a cuttings-sweeping device or gummer comprising one laminated impeller which, being power driven by the machine gear head or by a driving motor of its own, sweeps away the cuttings or gummings after these are dragged out of cut or kerf and discharged by the cutter chain and pushes them by pressure into a cuttings-pile or cuttings-dam behind or beside the cutting machine. The gummer, being of simple circular rotating movement and of symmetrical construction, is easily reversible.

For preventing the entry of any excessively large lumps of coal or rock to the sweeping laminated arms or blades of the gummer, which lumps perhaps could disturb the smooth working of the gummer, and for creating and maintaining free from cuttings the space inside or under the cuttings-pile where the new portions of cuttings from the cutter chain can enter easily, the working space inside which the sweeping laminated arm impeller is rotated is constructed low and flat. Its height is approximately the same thickness as the kerf or cut. The working space is formed between a plain upper steel sheet as cover, and floor of seam as bottom and is not protected by any walls but open on all sides. Walls for the space under the cuttings are formed by the cuttings themselves which lie around at their own natural slope of repose. There is no possibility, therefore, of the fouling of any pieces between rotating arms or blades and walls.

The gathering and conveying mechanism of the described type may be used also in long wall coal face loading machines. As the coal is discharged under continuous pressure one row of face roof supporting props, posted between the face conveyor and the loading machine, cannot be a hindrance to loading performance.

The gathering mechanism which is the subject of this invention being adapted for use in the gathering head of a mobile loading machine distinguishes by the simplicity of its motion which is of circular character and also by the ability to discharge the conveyed material under continuous pressure and a very clean gathering of loose material without spillage.

A feeder using the conveying mechanism which is the subject of this invention has the ability to discharge under pressure as well as the possibility of wide and infinitely variable regulation in capacity of supply.

Some examples embodying the invention will now be described with reference to the accompanying drawings, in which:

Fig. 5 is a plan view of a gathering head of a loading machine equipped with gathering mechanism according to the subject of this invention.

Fig. 6 is a section along irregular line 6—6—6—6 of Fig. 5.

Fig. 7 is a plan view partly in section showing diagrammatically the application of the mechanism to a feeder.

Fig. 8 is a sectional view along line 8—8 of Fig. 7.

Fig. 9 is a sectional view along line 9—9 of Fig. 8.

Figure 1:
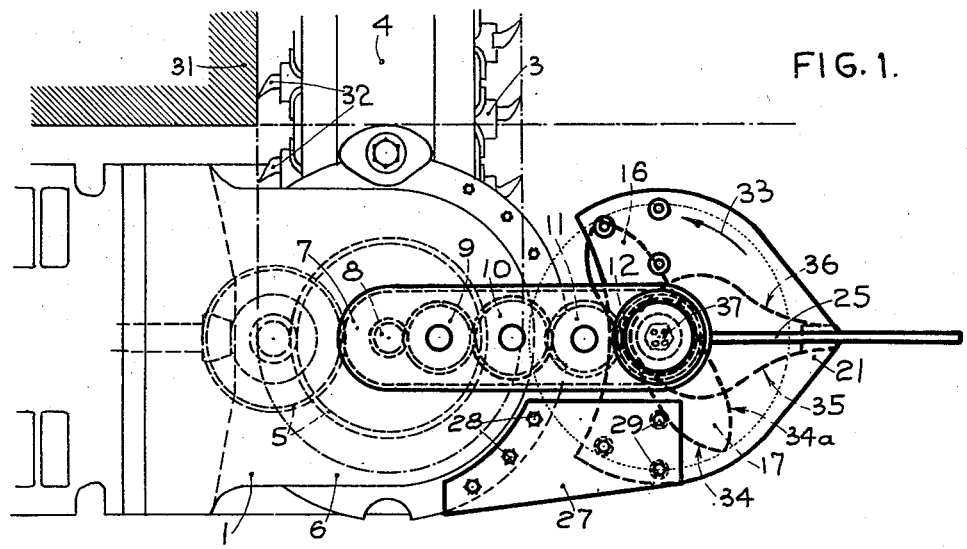
Fig. 1 is a plan view showing the gathering and conveying mechanism as it is adapted for use in a cuttings-sweeper or gummer associated with the gear head of a chain coal cutting machine.

The gathering and conveying mechanism for coal mining machines with reference to the said accompanying drawings will now be described in the following four cases of application: (a) In a cuttings-sweeper or gummer associated with chain coal cutting machines, (b) In a long wall coal face loading machine, (c) In a mobile loading machine for coal mines, (d) In a feeder for loose material with regulated quantity of delivery.

(a) *Application in a cuttings-sweeper or gummer*

On the driving gear head 1 (Figs. 1 and 2) of a cutting machine of a well known cutter chain type which, as usual, is provided with its driving motor 2, cutter chain 3 running in the jib 4 and driven by gearing 5 of a power transmitting mechanism included in gear head housing 6, a casing 7 is attached containing a train of several—in this case five—spur wheels 8, 9, 10, 11 and 12 which are provided as means for transmitting rotary motion from gear head driving mechanism 5 to a substantially vertical shaft 13. At the shaft 13 an extension part 14 is attached on which part several—in this case six—substantially horizontal laminae or blades 15 are drivingly mounted. The blades 15 are situated one above another so as to form two laminated arms 16 and 17. By rotating the shaft extension 14 the laminated arms 16 and 17 are rotated too and so are adapted to sweep away cuttings dragged out of the kerf and discharged by cutter chain 3.

Between each two adjacent laminae 15 are posted thin unmoveable laminae or blades 18 surrounding by their forward ends 19 the shaft 14 and by back ends 20 are firmly attached to the covering sheet 21 by means of intermediate parts 22 and bolts 23. The lowest unmoveable blade 24 is of a larger thickness to prevent bending. Covering sheet 21 together with tail chute 25 are firmly attached to the cylindrical part 26 of the casing 7 which itself is secured on to the gear head housing 6. Besides this connection the whole structure of the gummer is attached to the gear head housing 6 by means of a flat plate 27 screwed by means of bolts 28 to the flange of gear housing 6 and by means of bolts 29 to the covering sheet 21. Thus the plates 27 and 21 form a flat cover under which the laminated arms 16 and 17 are rotated.

There is also provided an easily detachable tail piece 30.

It may be understood that when the cutting machine is in cutting position and the cutter chain 3 runs and cuts kerf in the coal seam 31 by means of its picks 32, the arms 16 and 17 of the laminated impeller are rotated as shown by dotted line and arrow 33 passing alternately at every revolution in the vicinity of cutter chain 3 and through the separation wall formed by laminae 18. During their circular path the arms 16 and 17 sweep the cuttings from the chain away and deposit them in front of the separation wall or diaphragm formed by laminae 18.

Figure 2:
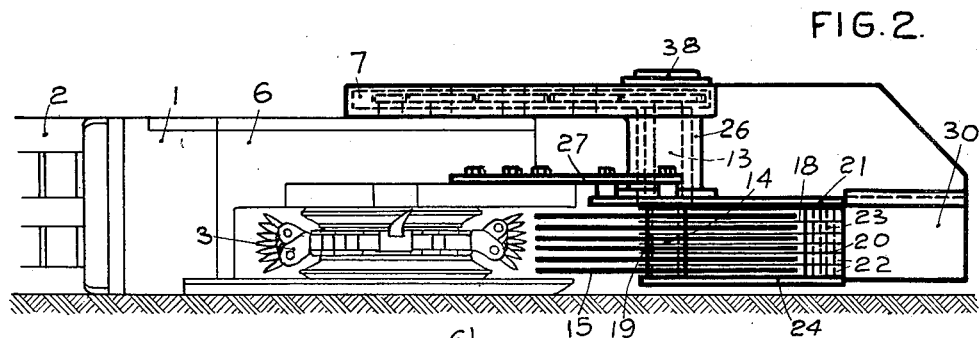
Fig. 2 is a side elevation of the gummer shown in Fig. 1.

As it may be seen clearly in Fig. 1 the outer profiles 34 and 34a of laminated arms 16 or 17 and the outer profiles 35 or 36 of the laminated separation wall are two enmeshed profiles shaped in such a manner as to maintain a large angle at each point of intersection of said two profiles. The angle between tangents to each profile is at any point of intersection approximately 90° which is of course much larger than the angle of bruising or self-wedging of any kind of conveyed material between the working profiles thus formed. This feature of the working profiles will ensure the easy dispersal of all kinds of conveyed material from the blades without any bruising, wedging or crushing, thus creating a smooth pumping effect by which cuttings are pushed into a pile behind or beside the machine under continuous pressure.

The laminated arms 16 and 17 together with their shaft 14 and all the immovable laminae 18 may be constructed so as to be easily detachable for example by means of bolt 37 placed under lid 38 for the purposes of removing them as a whole as well as the tail piece 30 and plate 27 to permit the cutter jib to be swung round to the other side of the cutting machine, or to place the jib straight and in line with the cutting machine at the end of the cutting operation and for idle travel or flitting of the machine to a new starting point of cutting work as is usual in practice.

Other main parts of the gummer have no need to be removed because they form no hindrance for the free passage of the jib from one side of the machine to the other with the cutter chain on the jib. It is, however, quite possible of course, to construct a collapsible attachment of the sweeper or gummer unit by which attachment the casing 7 may be pivotally mounted on the gear head housing 6. By such an attachment, removal of plate 27 only is required, and the gummer as a whole may be lifted up to enable the jib together with the cutter chain to pass underneath.

As it may be understood the mechanism of the gummer is fully reversible because it is able to work equally well when driven in either direction of rotation without any change in the mechanism itself. Thus, when the direction of cutting is to be changed the only adaption of the gummer which is necessary is to put the plate 27 on to right hand side or on to left hand side respectively as the case may be.

In the accompanying drawings (Figs. 1 and 2) is shown only one example of gummer construction using the gathering and conveying mechanism which is the subject of this invention as adapted to one given form of a definite longwall coal cutting machine, but of course constructions using the same mechanism may be adapted to any other given form of cutting machines of longwall type as well as of any form of shortwall type coal cutting machines too.

(b) *Application in a longwall coal face loading machine*

Figure 3:
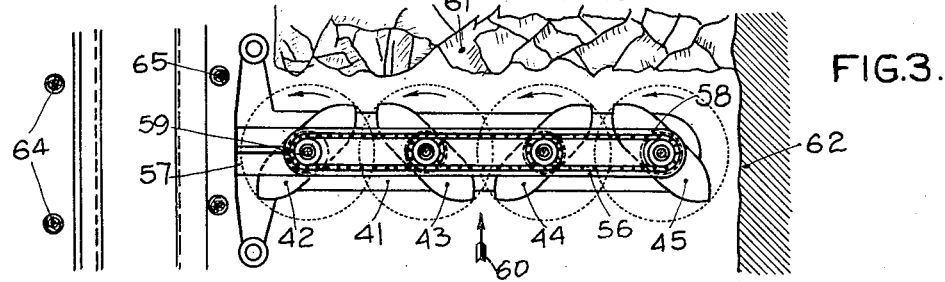
Fig. 3 is a plan view showing diagrammatically the mechanism in working position as it is adapted for use in a long wall coal face loading machine.
Figure 4:
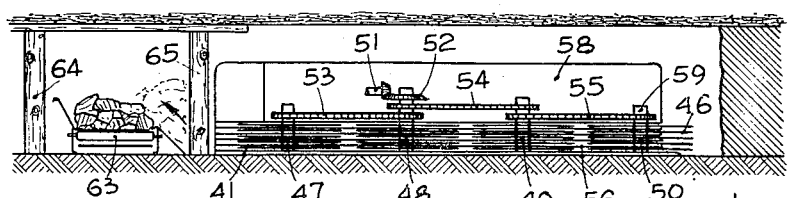
Fig. 4 is a side elevation partly in section of the machine shown in Fig. 3.

On a base plate 41 (Figs. 3 and 4) forming a part of a loading machine several—in this case four—laminated arm impellers 42, 43, 44 and 45 are arranged in a row. Each impeller 42, 43, 44 or 45 is of the same construction as that described above as for use in gummers associated with coal cutting machines and is built up in accordance with the subject of this invention. Each arm of said impellers comprises several—in this case five—substantially horizontal laminae or blades 46 drivingly secured one above the other on their separate shafts 47, 48, 49 or 50 and rotated simultaneously and all in the same direction as shown by arrows and dotted lines in Fig. 3 from the driving motor (not shown in the drawings) by means of bevel gears 51 and 52 and chain transmission 53, 54 and 55.

During their movement through their circular path of motion each of the two laminated arms of impellers 42, 43, 44 and 45 pass through the laminated separation wall built up in similar way by an adequate number of horizontal laminae or sheets 56 surrounding shafts 47, 48, 49 and 50 and connected together firmly at their forward ends 57.

Connection between the upper part 58 of the loading machine and the base plate 41 is achieved by means of cores 59 passing inside the shafts 47, 48, 49 and 50 from upper part 58 to the base plate 41.

By advancing the machine forward in the direction shown by arrow 60 towards the loose or semi-loose material 61 along the face of coal wall 62 by means of ropes or other common means (not shown on drawings), used in connection wth such kind of machines, the laminated arms of the impellers will pick up and push the material on to a face conveyor 63 situated along the longwall face between two rows of roof supporting props 64 and 65. Because of the possibility of discharging the coal or other material by the conveying mechanism under pressure the loading on to face conveyor 63 may be performed through one row 65 of props posted between the loading machine and the face conveyor 63.

It is understood that the loading machine being of symmetrical construction about a central vertical plane is able to load from either the right hand face or the left hand face by changing the direction of rotating motion of impellers 42, 43, 44 and 45 only. The reversing may be achieved for example by reversing the driving motor.

(c) *Application in a mobile loading machine*

In Figs. 5 and 6 is shown the gathering head of a mobile loading machine for underground loading of coal equipped with the gathering mechanism which is the subject of this invention.

On the plain slightly inclined plate 71, comprising the forward table of gathering head 72 of a loading machine, symmetrically to a vertical plane of the gathering head, two gathering laminated arm impellers 73 and 74 are posted each of which is of the same construction as was previously described in case of use in a sweeper or gummer associated with coal cutting machine.

Each arm of impellers 73, or 74, comprises several—in this case six—laminae 75 drivingly secured on their shafts 76 by means of keys 77 so as to form two laminated gathering arms 78 and 79. Between each two adjacent movable laminae 75 are attached immovable laminae 80 surrounding the bosses 81 of laminae 75 on the axle 76 and connected firmly together and to the table plate 71 by their tail ends 82.

On the same shafts 76 are drivingly mounted spur gears 83 and 84 by means of keys 85. The shafts 76 are each journalled in two anti-friction bearings 86 and 87. With spur gear 83 or 84 is meshed idler 88 or 89 respectively, each of which is journalled on shafts 89a by means of anti-friction bearings 90. Idler 88 or 89 is meshed with and driven by spur gears 91 and 92 respectively, each of which is secured on a shaft 93. On the same shafts 93 are secured drivingly bevel gear 94 or 95, each of which is meshed with and driven by bevel pinion 96 or 97 which both are attached on to the shaft 98. The shaft 98 bears two sprockets 99 and 100 on which run chains 101 and 102 of a machine chain conveyor provided with conveying flights 103.

The chains 101 and 102 being driven, during loading action, by the machine driving motor (not shown on the drawings) in the direction shown on Fig. 6 by arrow 104, drive sprockets 99 and 100 and rotate the shaft 98, which is journalled in two anti-friction bearings 105 and 106 and, by means of the above described transmission of gears, rotate both gathering impellers 73 and 74 in directions as shown on Fig. 5 by arrows and dotted lines.

During loading action when the gathering head 72 is pushed forward, the rotated arms 78 and 79 of impellers 73 and 74 will gather and pick up the loose or semi-loose material in front of and partly beside the machine, convey the material on the gathering table 71 and discharge into the path of the chain conveyor running in the middle trough 107 of the machine. The material will then be conveyed by the chains 101 and 102 and flights 103 rearwardly towards the discharging point of the loading machine.

It may be stressed here that the gathering head of a loading machine equipped with gathering mechanism according to this invention in comparison with other well known constructions of the same loading capacity may be built smaller especially in length dimension and has the quality of very clean gathering of all the material because of its ability to prevent any part of the gathered material from being dragged back or spilled beside the gathering head as it is

(d) Application in feeders for loose materials

On each side of a trough 111 comprising a feeder neck leading from container 112 filled with loose material 113, to the discharging place or troughing 114 are arranged two laminated arm impellers 115 and 116 constructed in accordance with the subject of this invention and similar to those described above.

Each impeller comprises two arms 117 and 118 formed by several—in this case by five—laminae 119 attached drivingly on common shafts 120. Between each pair of movable laminae 119 there are adjusted immovable laminae or sheets 121 the edges of which form side walls 122 and 123 of the trough 111.

The shafts 120 together with the laminated arms of impellers 115 and 116 in one row, are rotated in opposite directions to that in the second row, as shown in Fig. 7 by arrows and dotted lines from driving shaft 124 by means of bevel gears 125, 126 and 127 and chain transmission 128. During rotating movement each arm 117 and 118 by protruding through laminated walls 122 and 123 conveys the material in trough 111 from container 112 towards discharging point 129 and discharges it into troughing 114 under pressure when so needed.

For regulation of the capacity of the feeder supply, the laminated walls 122 and 123 formed by blades 120 and 121 (Fig. 9) may be moved towards each other by means of screw spindle 130, provided with left hand and right hand threaded parts 131 and 132 journalled in nuts 133 and 134, and by two wheels 135 and 136. By turning the spindle 130 the laminated walls 122 and 123 may occupy the limiting positions 137 and 138 as shown on Fig. 7 by dotted lines, at which position the supply of the feeder is zero. At the second limiting position of the wall 122 and 123 shown on Figs. 7 and 9 the capacity of supply reaches its maximum. It is to be understood that there is possibility of variation of the capacity infinitely between these two limits by simply turning spindle 130 by means of wheels 135 or 136.

In some cases of feeder applications the possibility of discharging under pressure as well as the possibility of infinite variation of delivery capacity is of great importance.

I declare that what I claim is:

1. A gathering and conveying mechanism for coal and like mining machines comprising in combination an impeller rotatable and substantially upright axle and having laterally projecting gathering and conveying arms or flights each of which comprises a plurality of parallel and substantially horizontal plain laminae or comparatively thin blades mounted drivingly one above another on said axle, leaving a relatively thin gap or slot between each two adjacent laminae, and a fixed separation wall or laminated diaphragm meshing with the arms of said impeller, and comprising a plurality of substantially horizontal laminae or relatively thin sheets immovably fixed one above another and located in the gaps of the arms or flights of said impeller.

2. A gathering and conveying mechanism for coal and like mining machines comprising in combination one pair of impellers situated one at each side of the material conveyed, rotatable in opposite directions to each other on substantially upright axles and having each laterally projecting gathering and conveying arms or flights each of which comprises a plurality of parallel and substantially horizontal plain laminae or comparatively thin blades mounted drivingly one above another on said axles, leaving a relatively thin gap or slot between each two adjacent laminae, and two fixed separation walls or laminated diaphragms each meshing with the arms of one impeller, and comprising a plurality of substantially horizontal laminae or relatively thin sheets immovably fixed one above another and located in the gaps of the arms or flights of said impellers.

3. A gathering and conveying mechanism for coal and like mining machines comprising in combination several impellers arranged in a row or series on one side of the material conveyed, rotatable all in the same direction on substantially upright axles and each having laterally projecting gathering and conveying arms or flights, each of which comprises a plurality of parallel and substantially horizontal plain laminae or comparatively thin blades mounted drivingly one above another on said axles, leaving a relatively thin gap or slot between each two adjacent laminae and a fixed separation wall or laminated diaphragm meshing with the arms of said impellers, and comprising a plurality of substantially horizontal laminae or relatively thin sheets immovably fixed one above another and located in the gaps of the arms or flights of said impellers.

JULIUS YARMAK.

REFERENCES CITED

The following references are of record in the file of this patent:

UNITED STATES PATENTS

| Number | Name | Date |
| --- | --- | --- |
| 324,674 | Fasnacht | Aug. 18, 1885 |
| 1,723,591 | Watkins | Aug. 6, 1929 |
| 1,752,714 | Wilcox | Apr. 1, 1930 |
| 2,031,544 | Moore | Feb. 18, 1936 |
| 2,459,915 | Brunne | Jan. 25, 1949 |